United States Patent [19]

Shah

[11] B 3,981,466

[45] Sept. 21, 1976

[54] INTEGRATED THERMAL ANTI-ICING AND ENVIRONMENTAL CONTROL SYSTEM

[75] Inventor: Anil D. Shah, Seattle, Wash.

[73] Assignee: The Boeing Company, Seattle, Wash.

[22] Filed: Dec. 23, 1974

[21] Appl. No.: 535,928

[44] Published under the second Trial Voluntary Protest Program on January 13, 1976 as document No. B 535,928.

[52] U.S. Cl. .................. 244/134 R; 60/39.09 D; 165/42; 244/53 B; 244/59; 244/118 P
[51] Int. Cl.² .................. B64D 15/02; B64D 13/08
[58] Field of Search ........... 244/134 R, 134 B, 53 B, 244/59, 118 P; 60/39.09 D; 165/42, 43; 415/178, 114, 121 R

[56] References Cited
UNITED STATES PATENTS

| | | |
|---|---|---|
| 2,594,118 | 4/1952 | Boyd .............................. 415/178 X |
| 2,712,727 | 7/1955 | Morley et al ................ 244/134 R X |
| 2,777,301 | 1/1957 | Kuhn ................................ 244/59 X |
| 3,341,114 | 9/1967 | Larson ....................... 60/39.09 D |

Primary Examiner—Trygve M. Blix
Assistant Examiner—Barry L. Kelmachter
Attorney, Agent, or Firm—Al Richardson; Bernard A. Donahue

[57] ABSTRACT

An integrated thermal anti-icing and environmental control system for a gas turbine powered aircraft uses hot high pressure bleed air from the turbine compressor to de-ice the wings and the engine air inlet, and supplies conditioned air for the aircraft cabin. In order to minimize total bleed air requirements and maximize heat recovery, bleed air exhausted from the inlet anti-icing system is passed sequentially through other systems. In this invention, the usual pre-cooler unit and the associated heat sink are eliminated and the pre-cooling function is performed within the inlet anti-icing system, preferably through the use of a double skin heat exchanger contained within the lip of the inlet. One embodiment of this system includes a closed-loop liquid anti-icing system for acoustic rings mounted in the inlet wherein the liquid is heated by passing the bleed air through a heat exchanger mounted immediately downstream of the inlet anti-icing system.

3 Claims, 7 Drawing Figures

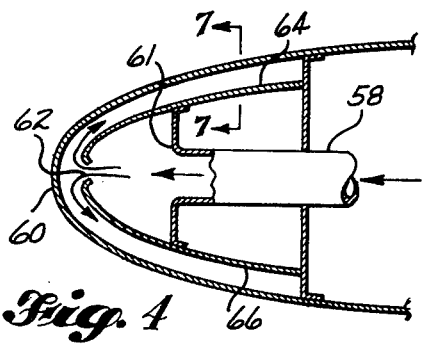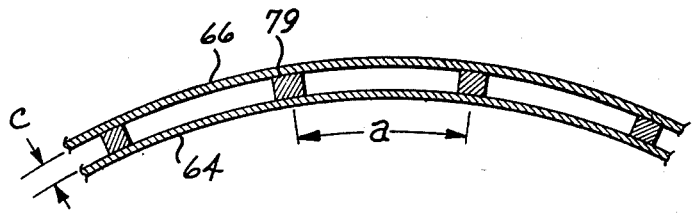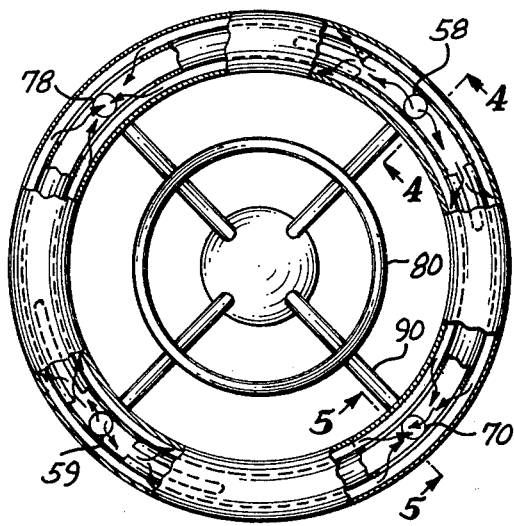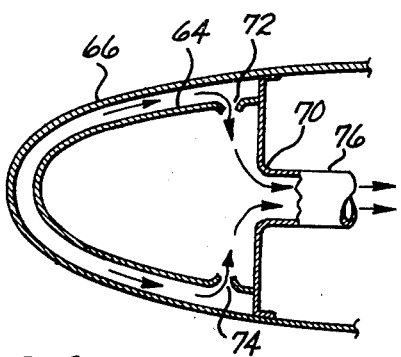

INTEGRATED THERMAL ANTI-ICING AND ENVIRONMENTAL CONTROL SYSTEM

BACKGROUND OF THE INVENTION

It is common in modern jet powered aircraft to find separate systems which perform the thermal anti-icing (TAI) and environmental control functions, utilizing hot, compressed gas from the engine compressors called "bleed air." In such aircraft a portion of the total bleed air available is routed to the various components in the aircraft which are subject to icing and then exhausted overboard. The remainder of the bleed air is routed to the environmental control system (ECS) where it is used to heat (or cool) and pressurize the aircraft cabin. These systems may be referred to as "open" systems because each portion of bleed air used to de-ice a particular component, such as the wing leading edges or the engine inlet, is simply exhausted overboard even though all useful heat has not been extracted.

FIG. 1 is a schematic diagram of a typical open system combining the thermal anti-icing and environmental control functions. Engine bleed air is drawn from a suitable stage (or stages) of the engine compressors and is routed through a heat exchanger, called a pre-cooler, which is normally located somewhere in the engine nacelle. Cooling is generally accomplished by passing cool air from the engine fan stage source 14, through the pre-cooler 12, and exhausting it overboard. Flow of the cooling air is controlled by shut-off valve 16.

The bleed air, cooled to about 450°F or lower by the pre-cooler, is now available for use in the various TAI sub-systems and in the cabin environmental control sub-system (ECS). Air flow into the inlet and acoustic ring (if any) TAI systems 18 is controlled by a shut-off and pressure regulator valve 20. Further downstream, the bleed air must pass through a pressure regulator 22 before flowing into the wing TAI system 24 or the environmental control system 28. Flow into the wing TAI system 24 is controlled by shut-off valve 26. Flow entering the environmental control system 28 passes first through shut-off valve 30, then through flow control valve 32, through an air cycle machine 34, and into the aircraft cabin 36 before being exhausted overboard. While the aircraft is on the ground, cabin air may be supplied through duct 38 from an auxiliary power unit (APU).

It has been found that the extraction of bleed air from high-bypass-ratio turbofan engines imposes a significant penalty on engine performance, so it is desirable to minimize bleed air requirements as much as possible. Modern wide-bodied jet transports impose large bleed air demands on their engines, and the addition of noise-suppressing devices, such as acoustic rings, in the engine air inlets which require anti-icing may impose unacceptable demands on the engine. One possible solution to this problem is to make more efficient use of bleed air heat with an improved, integrated thermal anti-icing and environmental control system as described herein.

Most present systems route a portion of the total available bleed air to each of the TAI sub-systems and then discard each portion overboard, even though it may still contain usable heat. It may be impractical to attempt to recover heat from certain anti-icing systems because of their locations or because of the additional weight which would be added by the recovery ducts. On the other hand, where certain systems are located in relatively close proximity to each other, it is possible to pass bleed air sequentially from one system to the next until most of the useful heat is extracted. Present systems also waste bleed air heat by passing the bleed air through an initial pre-cooling unit such as pre-cooler 12 shown in FIG. 1. According to this invention, the pre-cooler is eliminated and its function is performed by the inlet TAI system which uses the heat ordinarily wasted by the pre-cooler.

Another means for conserving bleed air and bleed air energy found in one particular embodiment of this invention is a closed-loop liquid anti-icing system for acoustic rings. Most rings are inherently difficult to heat internally with air because of their geometry. The air passages must be narrow and complex, and as a result, high pressure losses occur in the bleed air. In this embodiment, these losses are avoided by the use of closed-loop liquid anti-icing system wherein heat is transferred to the liquid in a heat exchanger from bleed air which is previously passed through the inlet TAI system.

The use of bleed air as a source of heat for de-icing is well known in the art. A typical such use is described in U.S. Pat. No. 3,341,114 to H.A. Larson dated Sept. 12, 1967, wherein bleed air is ducted through the inlet guide vanes of a gas turbine engine for de-icing. It is also common to use engine bleed air from multiplicity of tasks on the same aircraft. In U.S. Pat. No. 2,777,301 to J. Kuhn dated Jan. 15, 1957, a power and air-conditioning system is disclosed which uses engine bleed air and includes an air cycle machine. In this patent, it is suggested that bleed air may be ducted away from the system for use in de-icing systems and other accessories.

It is also common to de-ice the surfaces of various aircraft components by circulating a hot liquid through them. In spite of the better heat transfer characteristics obtainable with liquids such systems have seen limited use in aircraft as compared to air circulating systems because of increased weight and leakage problems. A system for de-icing intake components which may use either engine lubricant or coolant is described in British Pat. No. 629,044. In this system liquid is circulated by a pump through the various parts to be de-iced and these parts act simultaneously as radiators to cool the liquid before it is returned to the engine.

SUMMARY OF THE INVENTION

The disclosed invention involves an integrated thermal anti-icing and environmental control system designed for use on a gas turbine powered aircraft utilizing hot, high pressure bleed air from the engine's compressor. The system includes a means connected to the bleed air source for distributing a portion of the bleed air within the wing of the aircraft to de-ice the wing and a second means connected to the bleed air source for distributing another portion of the bleed air to various parts of the engine air inlet for de-icing purposes. Bleed air circulating within engine inlet anti-icing sub-system is cooled and discharged at a predetermined maximum temperature into an environmental control means wherein its temperature and pressure are adjusted to provide a suitable atmosphere in the passenger cabin. In one embodiment of this invention where acoustic rings are installed in the engine air inlet to provide noise suppression, a closed-loop liquid anti-icing system is added to de-ice the acoustic ring. In this embodiment, the heat exchanger is interposed between the inlet TAI system and the environmental control system which transfers heat from the bleed air to a liquid which is circulated through acoustic ring.

One object of this invention is to provide for an integrated thermal anti-icing and environmental control system for jet powered aircraft which makes more efficient use of bleed air drawn from the engine than conventional systems and thereby reduces total bleed air requirements. Another object of this invention is to provide an integrated and thermal anti-icing and environmental control system which extracts greater amounts of heat from bleed air than conventional systems by passing it sequentially through the thermal anti-icing and environmental sub-systems.

A further object of this invention is to reduce the weight and simplify the installation of an integrated thermal anti-icing and environmental control system by eliminating the pre-cooler unit fan bleed air source and associated controls found in most conventional systems.

BRIEF DESCRIPTION OF THE DRAWINGS

FIG. 4 is a partial section of the lip of a typical engine inlet taken at 4—4 in FIG. 5.

FIG. 5 is a front view of a typical engine inlet.

FIG. 6 is a partial section of the inlet in FIG. 5 taken at 5—5.

FIG. 7 shows a cross-section of the inlet lip of FIG. 4 taken at 7—7 illustrating the construction of a double skin heat exchanger.

DETAILED DESCRIPTION

Figure 1:
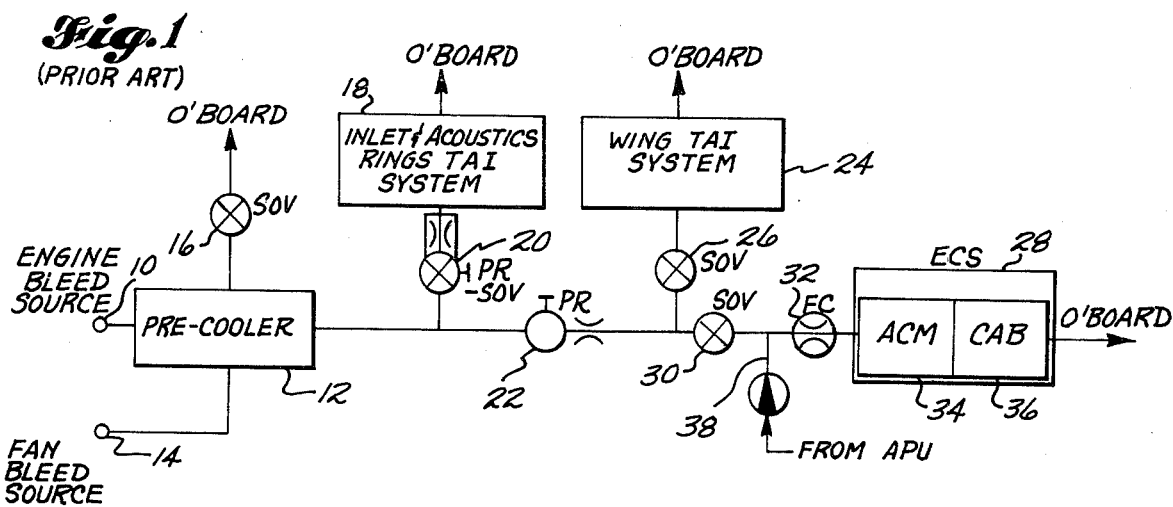
FIG. 1 is a schematic diagram of a conventional integrated thermal anti-icing and environmental control system.
Figure 2:
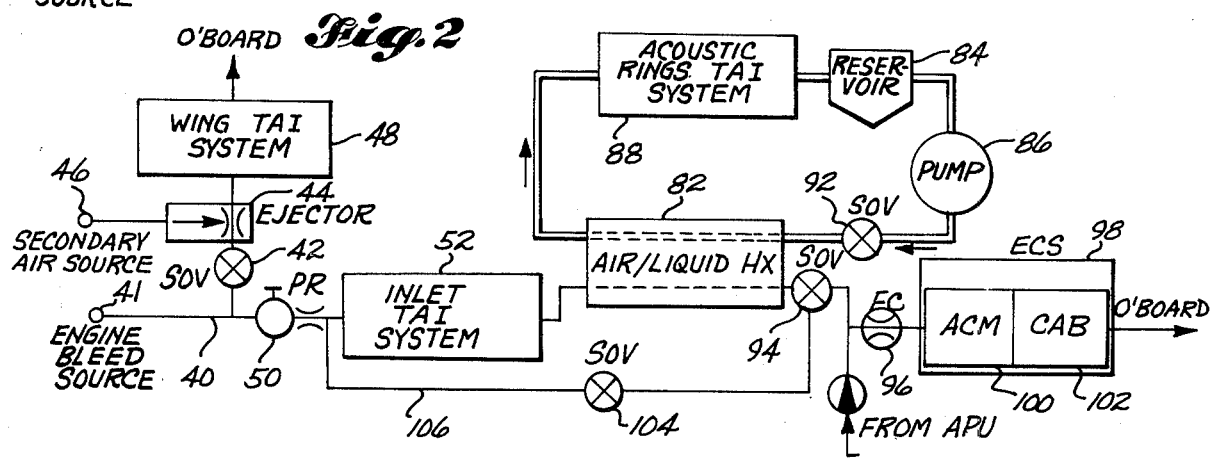
FIG. 2 is a schematic diagram of the disclosed integrated thermal anti-icing and environmental control system including a closed-loop de-icing sub-system for acoustic rings.
Figure 3:
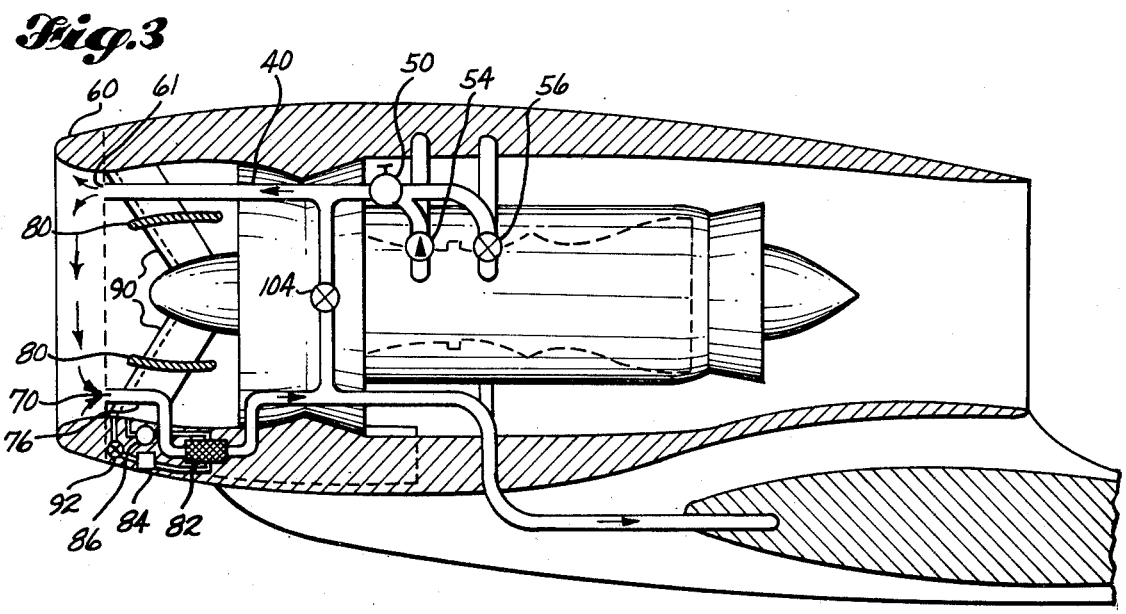
FIG. 3 is a partial section taken trhough a typical engine nacelle showing various components of the disclosed system.

In FIG. 2 a system is illustrated which efficiently combines the functions of thermal anti-icing and cabin environmental control utilizing hot, compressed air as its principal source of heat. Bleed air enters the system in duct 40 from the source 41, which is normally a suitable compressor stage (or stages), at high pressure and temperatures in the range of 800° to 1200°F. Air may actually be drawn from two compressor stages as shown in FIG. 3, where the flow is controlled by check valve 54 and shut-off valve 56. When the wing TAI system 48 is in use, shut-off valve 42 is opened, permitting a portion of the air to flow through ejector 44 where it is cooled and its pressure is reduced somewhat. The ejector 44 may require air from a secondary air source 46 which may supply either ambient air or air taken from the engine fan stage. After leaving the ejector 44, the air flows through the wing TAI system 48 and is exhausted overboard.

Bleed air not used in the wing TAI system 48 passes through pressure regulator 50 and then into the inlet TAI system 52. One important feature of the disclosed inlet system 52 is that it serves to heat those parts of the inlet which are subject to icing and also serves as a pre-cooler, lowering the temperature of the bleed air so that it does not exceed a pre-selected maximum temperature. In most aircraft and especially in commercial types, it is undesirable to transport very hot gasses away from the immediate area of the engine nacelle area, sometimes referred to as the "fire zone," because of the potential fire hazard. In the design of an aircraft, a maximum temperature limitation of 450°–550°F may be placed on fluids circulating in the aircraft outside the fire zone. Since bleed air coming directly from the compressor exceeds that temperature range it is necessary to cool it by some means before passing it into the various anti-icing systems and environmental control system.

Formerly, this cooling has been accomplished in a unit called a pre-cooler which is normally mounted in the engine nacelle. In addition to add weight and taking up additional space in the nacelle, the pre-cooler wastes a significant amount of the heat energy in the bleed air. In the disclosed embodiment, the inlet TAI system 52 is designed with thermal characteristics such that bleed air leaving the system will not exceed the maximum temperature limitation. Again, referring to FIG. 3, it is seen that bleed air reaches the inlet system 52 located in inlet lip 60 by passing through duct 40 or a similar, symmetrically located duct, which is not shown. It should also be noted that components of the wing TAI system located in the nacelle have been omitted from FIG. 3 for clarity.

After passing through supply port 61, the bleed air continues through opening 62 in the inner skin 64 and circulates radially in either direction in the space between the inner skin 64 and the outer skin 66 as shown by the small arrows in FIG. 5, transfering heat to the outer skin 66. As the flow approaches return port 70, it passes through opening 72 and 74 in the inner skin 64 and into return duct 76 as illustrated in FIG. 6. The flow also leaves the system in a similar manner through return port 78 on the opposite side of the lip 60.

Details of the double skin heat exchanger used in inlet system 52 are shown in FIG. 7. The inner skin 64 and the outer skin 66 are separated a distance $c$ by spacers 79 which are located a distance $a$ apart. This type of heat exchanger is known in the art and the design details necessary to achieve the desired heat transfer properties thereof need not be discussed in detail. of course other types of heat exchangers can be used in place of the one shown, but the double skin type is preferred in order to obtain the desired temperature decrease in the bleed air.

When acoustic rings are employed in the engine inlets such as ring 80 shown in FIG. 5, the bleed air passes directly from the inlet system 52 to an air/liquid heat exchanger 82. Fluid drawn from reservoir 84 is circulated by pump 86 through the heat exchanger 82 and then into the acoustic ring TAI system 88. The fluid enters and leaves the ring 80 through internal passages in struts 90, and flow in the system is controlled by shut-off valve 92.

After leaving heat exchanger 82 (or the inlet system 52 when the acoustic ring system is not present) the bleed air passes through shut-off valve 94 and flow control valve 96 into the environmental control system 98. There the flow is conditioned by an air cycle machine 100, circulated through the passenger cabin 102, and finally exhausted overboard. The details of such environmental control system are well known to those skilled in the art and numerous variations of the system are possible.

Under certain conditions such as those found at high altitude on a cold day, it may be necessary to supply an above-average amount of heated air to the environmental control system 98 in order to maintain a comfortable temperature in the passenger cabin. When shut-off valve 104 is open, hot bleed air can travel directly from the compressor to the environmental control system 98 through bypass line 106. Also, when the aircraft is sitting on the ground, air for the environmental control system 98 can be supplied from an auxiliary powered unit (APU) through supply line 108. When an auxiliary air supply is used, shut-off valve 94 is closed to prevent a reverse flow of air through the heat exchanger 82 and the inlet system 52.

While certain preferred embodiments of the disclosed invention are described herein, it will be understood that all obvious changes and modifications to the invention may be made by those skilled in the art to which this invention pertains without departing from the spirit and scope of the invention as set forth in the claims appended hereto.

What is claimed is:

1. An integrated thermal anti-icing and environmental control system for use on aircraft having a wing, a passenger cabin, a gas turbine powerplant, an inlet supplying air to the powerplant and an acoustic ring mounted with said inlet comprising:

a source of hot, compressed air;
   first means connected to the source for distributing a portion of the air within the wing for anti-icing purposes;
   second means connected to said source for distributing a second portion of the air within the inlet for anti-icing purposes and for cooling that portion of the air to a pre-determined maximum temperature;
   a heat exchanger connected to the second means;
   a liquid;
   closed-loop means for circulating the liquid through the heat exchanger and the acoustic ring;
   environmental control means connected to said heat exchanger for conditioning and pressurizing air for the passenger cabin.

2. An integrated thermal anti-icing and environmental control system for use on an aircraft having a cabin, a gas turbine power plant and an inlet supplying air to the turbine comprising:

a source of hot, compressed air;
   a conduit for carrying a portion of the air from the source to the inlet;
   an inlet lip containing a double skin heat exchanger through which the air may pass to de-ice the inlet and to become cooled to a predetermined maximum temperature;
   a conduit for collecting the cool air from the inlet lip;
   environmental control means connected to the collecting conduit and utilizing the air exhausted from the inlet for conditioning and pressurizing the cabin.

3. The apparatus of claim 2 wherein the inlet lip includes an outer skin, one surface of which is exposed to air flow entering the inlet, an inner skin spaced apart from the outer skin to permit passage of bleed air therebetween, and spacers located between the skins.

* * * * *